United States Patent [19]

Melachouris et al.

[11] Patent Number: 4,740,380
[45] Date of Patent: Apr. 26, 1988

[54] CALCIUM FORTIFIED ACID BEVERAGES

[75] Inventors: Nicholas Melachouris, White Plains; Chang R. Lee, Yonkers, both of N.Y.

[73] Assignee: Stauffer Chemical Company, Westport, Conn.

[21] Appl. No.: 830,314

[22] Filed: Feb. 18, 1986

[51] Int. Cl.[4] .............................................. A23L 1/304
[52] U.S. Cl. ...................................... 426/590; 426/74
[58] Field of Search ................ 426/74, 590, 477, 650; 424/153

[56] References Cited

U.S. PATENT DOCUMENTS

| | | | |
|---|---|---|---|
| 2,325,360 | 7/1943 | Ayers et al. | 426/599 |
| 3,114,641 | 12/1963 | Sperti et al. | 426/599 |
| 3,865,933 | 2/1975 | Mudge | 424/153 |
| 3,897,550 | 7/1975 | Reynolds | 424/153 |
| 4,405,600 | 9/1983 | Besic | 127/30 |
| 4,497,800 | 2/1985 | Larson | 426/74 |
| 4,515,770 | 5/1985 | Besic | 426/658 |
| 4,551,342 | 11/1985 | Nakel et al. | 426/590 |

FOREIGN PATENT DOCUMENTS

| | | |
|---|---|---|
| 2219778 | 9/1974 | France . |
| 54-8767 | 6/1977 | Japan . |
| 5931710 | 8/1982 | Japan . |

OTHER PUBLICATIONS

Henry et al., Chem. Abstracts, 93(8)79955s.
Cotte et al., Chem. Abstracts, 89(18)152743v.

*Primary Examiner*—Raymond N. Jones
*Assistant Examiner*—Carolyn Paden
*Attorney, Agent, or Firm*—Paul J. Juettner

[57] ABSTRACT

A clear, calcium-fortified aqueous acidic beverage is provided which can contain large amounts of dietary calcium while remaining clear and storage stable even during pasteurization and refrigeration. The beverage can comprise a clear aqueous solution of an organic calcium compound such as calcium gluconate at a pH of about 4 and below wherein the calcium compound content does not exceed the solubility limit of the compound in water. An inorganic calcium salt can be used alone or in combination with an organic calcium compound to form an acidic beverage provided the pH is adjusted with an organic acid.

14 Claims, No Drawings

CALCIUM FORTIFIED ACID BEVERAGES

BACKGROUND OF THE INVENTION

The present invention relates to a clear, calciumfortified, acidic beverage to be used to provide dietary calcium supplementation.

Calcium deficiencies have been noted as a major health problem, particularly for women. Osteoporosis, an accelerated bone loss, can occur when the body is deficient in calcium. During a period of calcium deficiency, calcium that is needed for various body functions can be retrieved from bones and thereby prevent bone remodeling. Premenopausal adult women require about 1,000 milligrams of calcium per day (based on recommendations by the 1984 NIH Consensus Development Panel on Osteoporosis). Younger women, particularly pregnant and lactating women and post-menstrual women may require more. Further, adequate calcium intake before age 35 may lessen the effect of osteoporosis in later life.

One of the major sources of available calcium for dietary purposes is dairy products. Since fluid milk provides about 300 milligrams calcium per 240 milliliter (8 ounce) serving, the consumption of approximately 6/7 of a liter of milk would be necessary to provide the present minimum recommended amounts of calcium. As this amount of milk can be overbearing, it has been proposed to enrich the milk with a source of dietary calcium to reduce the amount of fluid intake needed to achieve a specific level of calcium supplement. However, many of the very people who need the calcium do not like the taste of milk. A calcium enriched milk is not the answer for those people. Further, due to lactose intolerance, milk may not be a practical source of calcium for some people.

Those who cannot tolerate milk can increase their calcium intake by the use of tablets or capsules of calcium salts such as calcium carbonate. However, since the consumption of beverages other than milk, such as soft drinks, is common in everyday life, it would be desirable to develop a beverage which can be consumed as soft drinks, particularly by people who cannot tolerate milk.

Calcium enhancement of dairy products can be readily achieved by incorporating insoluble calcium salts in the milk. The use of a suspending agent can prevent the insoluble compound from settling. Due to the opaque nature of the milk, the suspended calcium salts are hidden. Further, suspending agents can change the consistency of the milk and the insoluble calcium salts can affect mouth feel. However, such leeway is not present in clear beverages.

Because a number of popular beverages are clear citrus or cola drinks are acidic, it would be desirable to develop a clear calcium fortified acidic beverage that could be utilized in the same manner as beverages commonly in use. Contrary to milk, a clear beverage must be storage stable for long periods of time and not evidence any clouding or precipitation after pasteurization and various heating/cooling cycles. Cola beverages which are characterized by a lower pH may form a more suitable base for calcium orthophosphates which are soluble only below pH 3. Milk systems are not as critical inasmuch as the opacity of the milk masks any clouding caused by the calcium salt.

Because most of the calcium in the diet is excreted or lost in the urine and in perspiration, only about 20 percent of the calcium may be available for retaining the calcium balance in plasma and tissues and in bone remodeling. Therefore, any calcium fortified clear beverage must contain sufficient calcium to provide the amount needed for body functions and bone remodeling after losses.

Numerous calcium supplements are presently available on the market. Calcium carbonate, calcium lactate, calcium gluconate and calcium glubionate are commonly used. Calcium carbonate has 40 percent calcium and is generally available in tablet form. Calcium lactate has 13 percent calcium and calcium gluconate has 9 percent calcium. Calcium glubionate is used as the calcium source in a calcium supplemental syrup for infants. Calcium gluconate is available as an injectable solution. The amount of calcium compound present in a tablet does not present the problems which arise in formulating a liquid beverage, particularly one that is clear and storage stable. In using compounds with low calcium contents, larger amounts must be dissolved in the beverage to attain a high level of calcium fortification. The prior art does not teach one of ordinary skill in the art the method of preparing a calcium-fortified acidic liquid, clear beverage.

It would be hghly desirable to formulate a non-dairy acidic liquid calcium supplement which is clear and palatable and which does not develop aftertaste nor precipitate upon standing.

SUMMARY OF THE PRESENT INVENTION

A clear, storage-stable, calcium-fortified acidic beverage or a syrup for preparing the same is provided comprising a clear aqueous solution of calcium compound(s) at a pH of about 4 and below wherein the calcium compound is present in an amount sufficient to provide at least 300 milligrams dietary calcium per 240 milliliters. The acidic calcium-fortified beverage provided is stable and palatable and does not develop off taste. These ends will become more apparent from the detailed description which follows. The beverage can be carbonated or non-carbonated as desired.

DETAILED DESCRIPTION OF THE INVENTION

The sources of dietary calcium as used in the present invention include food-grade calcium salts of organic and inorganic compounds. The calcium compounds must be capable of being solubilized such that a clear solution at a pH of about 4 and below can be obtained. Calcium salts which adversely affect flavor, calcium absorption or biological functions are to be avoided. Preferably, preformed calcium compounds are used but the invention also includes calcium compounds formed in situ.

The inorganic calcium compounds which can be used are any food-grade calcium compound that is soluble and does not cause adverse flavor or biological problems. These salts can be illustrated by the oxide, hydroxide, carbonate, orthophosphate(s) (mono-, di- and tricalcium phosphate) with the carbonate being preferred.

The organic calcium compounds are food-grade compounds which do not adversely affect the flavor or biological system. There are numerous organic calcium compounds used as calcium enrichers. Among the organic calcium compounds are calcium gluconate, calcium glubionate (a.k.a. Calcium D-gluconate lactobionate monohydrate), calcium gluceptate, calcium glycerophosphate, calcium lactate, calcium levulinate, calcium lactophosphate, calcium citrate, calcium acetate, calcium ascorbate, calcium tartarate, calcium malate and the like and mixtures thereof. Any of these calcium enrichers may be used as long as they do not adversely affect the flavor of the beverage in which they are used.

The preferred salt is calcium gluconate. As calcium gluconate cannot be solubilized by heating a suspension of the compound at an acidic pH, it is necessary in order to form a clear beverage to presolubilize the calcium gluconate. The gluconate can be easily presolubilized by heating an aqueous dispersion of the salt at native pH (about 6–7) to a temperature ranging from about 50° C. to about 95° C. before acidification. The amount of gluconate is preferably below the solubility limit at the refrigerated temperature normally used for cooling beverages. Once the calcium gluconate is in solution, the pH can be lowered by the use of any food-grade organic or inorganic acid.

The dissolution rate of calcium citrate has been found to be essentially not adaptable to forming a clear solution at native pH. A calcium salt neutralized by citric acid produces calcium citrate in situ in solution which forms crystals very slowly avoiding precipitation problems. The organic calcium compound must be capable of being formed into a clear, stable solution at acidic pH's.

The amount of calcium compound used depends on the percentage of calcium in the compound(s) and the level of supplemental calcium to be dispensed per unit amount of the beverage. The amount of calcium compound also depends on the recommended daily allowance for calcium and the percentage of that allowance to be dispensed per unit amount of beverage. For a practical commercial product, 240 milliliters can be used as a unit dosage. While the calcium compound can be used in any amount per unit dosage up to the solubility limit of the calcium compound in that system, at least 300 milligrams, preferably at least 550 milligrams and more preferably at least 600 milligrams calcium is present per unit dosage of beverage. The calcium content can also be governed by the number of daily doses, e.g. 2 doses.

The invention is also based on the unexpected observation that selection of specific acids is necessary to avoid off taste problems with certain calcium compounds. Solutions of organic calcium compounds can be acidified with either or both organic or inorganic acids without developing off tastes. Solutions of inorganic calcium salts, either alone or in combination with organic calcium compounds, must be acidified with an organic acid either alone or in combination with a mineral acid.

It has been observed that inorganic salts develop an off flavor when the beverage is acidified with an inorganic acid such as phosphoric acid as the sole acidulant. Thus, inorganic calcium salts such as the carbonate, oxide and hydroxide singly, in admixture or in admixture with organic calcium compounds such as the gluconate must be acidified with an organic acid. The preferred acid is citric acid used alone or in combination with phosphoric acid. When using a combination of acids, the ratio of organic acid to inorganic acid should be in an amount ranging from about 5:1 to about 1:5, and preferably from about 2:3 to about 3:2 on a weight basis.

The degree of acidity is dictated by the tartness in the flavor desired. Since one of the popular flavors is a citrus flavor, pH's within the range of from about 3 to about 4 are desirable. These pH's can also be used if an inorganic calcium compound such as calcium hydroxide, calcium oxide or calcium carbonate is used as a supplement calcium source (less than 50 percent of the total added calcium). These salts are not soluble at more neutral pH's. Clear beverages utilizing combinations of organic and inorganic calcium salts of the type mentioned above desirably have a pH which assists in dissolution, the point of dissolution varying depending on the salts added. Additional acid may be added for flavor. Since the calcium compounds can have a buffering effect, more acid is needed to obtain the desired pH than a system not so buffered. Since the taste buds are sensitive to both free acid and total acid, the amount of acid used to acidify the buffered beverage may cause an undesirable tartness. The pH is adjusted with this understanding in mind.

Any food grade acid can be utilized to adjust the pH of the organic calcium-containing compound. For example, phosphoric acid, fumaric acid, citric acid, adipic and malic acid can be used without developing off taste. However, if the calcium gluconate is used with an inorganic salt such as calcium carbonate, phosphoric acid used alone develops an off taste. Thus, when calcium gluconate is used in combination with calcium carbonate, organic acids or a combination of an organic acid such as citric acid with an inorganic acid such as the phosphoric acid is required. Hydrochloric acid is less preferred as the chlorine ion can be nutritionally disadvantageous. The ratio of acids is such as to provide the desired pH level without developing an off taste. Preferably, the acids used for acidification are citric acid and phosphoric acid.

Calcium carbonate when used at an acidic pH may develop some $CO_2$ evolution upon destruction of some of the carbonate. The calcium levels are generally calculations based on the starting materials so that the final amount of calcium is not affected.

It has further been found that maltodextrin with a dextrose equivalent of from about 10 to about 20, also known as a glucose polymer, has been found to assist in stabilizing the calcium compounds in the acid beverages. It is also known that maltodextrin is an agent that assists in increasing calcium absorption in the body. In the preferred compositions of the present invention, maltodextrin is included in an amount of ranging from about 10 up to about 40 percent, and preferably from about 15 to about 30 percent based on the solids content in the beverage.

The acidic beverage of the present invention is preferably flavored and sweetened to improve its organoleptic acceptability. Known natural sweetening agents such as corn syrup solids, glucose, fructose, sucrose and the like, as well as artificial sweeteners such as saccharin, cyclamates and aspartame can be added in an amount sufficient to provide a sweet flavor. Natural and artificial flavors including fruit and cola flavors can also be added. The composition of the present invention can also include fruit juice or fruit juice extract, preferably without suspended particulates such as citrus fruits and/or cranberry juice as desired. Natural or artificial coloring can be added as desired.

The beverage compositions of the invention can also include other ingredients normally found in soft drinks such as clouding agents, preservatives and the like. The provision of the clear beverage allows for the controlled clouding and also coloring of the beverage. The beverages can also contain protein for protein fortification though protein may be disadvantageous for calcium absorption, vitamins and minerals as well as agents which contribute to calcium absorption. Preferably, the additives do not incorporate additional particulates in the beverage. Preferably, fully soluble materials such as protein hydrolysates can be used. Trace amounts of magnesium and zinc salts may contribute to absorption. Dairy products such as whey protein can be added as clouding agents to simulate natural pulp.

The beverages can also be carbonated to provide organoleptic characteristics similar to known soft drinks according to known techniques.

The compositions of the present invention can also be prepared in an isotonic formulation to assist in the osmotic absorption of the fluid and the salts. These products are well known. The amount of sugar and salts are adjusted to provide the desired osmotic pressure. The amount of sugar can be decreased and the flavoring accentuated by synthetic sweeteners.

A proposed procedure for preparing the calcium-fortified beverages of the invention includes the steps of mixing the calcium compounds with the sweetener and the maltodextrin to form a dry mix. Water is added to the dry mix and the ingredients dispersed. Calcium gluconate, alone or in combination with other calcium compounds, requires presolubilization by heating to 50°-95° C. After solubilization, the pH is adjusted to 3-3.5 or as desired with acidulants singly or in combination. Suitable flavor concentrates, preservatives and colors are added as desired. The volume is adjusted to the appropriate level and the beverage bottled and pasteurized according to good manufacturing techniques.

The compositions of the invention can also be prepared as a syrup which can be later dissolved in water, carbonated water, juice and mixtures thereof, and bottled. The syrup preferably contains sufficient calcium and acidity such that only dissolution is required. Alternatively, pH adjustment, coloring and flavoring can be accomplished at the time of dissolution.

The present invention is more fully illustrated in the Examples which follow:

EXAMPLE 1

A calcium-containing beverage was prepared by presolubilizing 53.80 grams calcium gluconate in 1500 milliliters water by heating at the native pH of the gluconate at a temperature of about 70° C. until the gluconate dissolved.

Separately, 200 grams sucrose and 60 grams maltodextrin from about 10 to about 20 DE were dry mixed. The mixture was added and dissolved under stirring in the predissolved gluconate solution.

A solution of 5.0 grams of 85 percent phosphoric acid diluted with about 5 milliliters of water was added slowly to the gluconate/sucrose/maltodextrin solution under stirring. The solution was adjusted to pH 3.50 with citric acid-monohydrate. About 5.8 grams of citric acid-monohydrate was required for the pH adjustment.

To this solution, 1.1 milliliters of Natural Lemon/Lime flavor obtained from T. Hasegawa USA was added. The volume of solution was adjusted to 2 liters with water.

The beverage was bottled in sterile bottles, pasteurized for 10 minutes at 80° C. and stored at both room temperature and at 4° C. (refrigerator). The beverage contained 0.25 percent weight/volume calcium, 10 percent sucrose and 3 percent maltodextrin. The beverage was and remains stable both at room temperature and at 4° C. and did not develop an off taste and retained its clarity. An informal flavor panel found that the beverage was pleasant and palatable.

In a separate experiment, 0.1 grams of sodium benzoate was added as a preservative. The use of sodium benzoate is optional and does not affect the flavor or solution stability of the finished beverage.

EXAMPLE 2

Calcium carbonate in an amount calculated to provide 0.25 percent calcium (W/V) in the finished beverage was dry mixed with 10 percent (W/V) sucrose, and 3 percent maltodextrin (10-20 DE). The dry mix dispersed well in 1500 milliliters water. The pH was adjusted to 3.0 with citric acid and phosphoric acid following the procedure in Example 1. The amount of phosphoric acid (85 percent) used was 17.2 grams and about 25 grams of citric acid-monohydrate was required for the pH adjustment. After adding flavor concentrates and preservatives, the volume was adjusted to 2 liters. The product was bottled in sterile bottles, pasteurized for 10 minutes at 80° C. and stored both in the refrigerator and at room temperature. A storage stable clear acidic beverage with some tartness without off taste was obtained. The flavor panel found that the beverage was palatable and pleasant.

EXAMPLE 3

A 50/50 blend of the products of Examples 1 and 2 was prepared by pre-dissolving 26.90 grams of calcium gluconate in 1500 milliliters of water as outlined in Example 1. Calcium carbonate in an amount of 6.25 grams was dry blended with 10 percent sucrose and 3 percent maltodextrin (W/V of final beverage). After dispersing the dry blend in the aqueous solution of calcium gluconate, the pH was adjusted to about 3.5 with a blend of citric acid and phosphoric acid using about 11.25 grams of phosphoric acid (85 percent) and about 10 grams of citric acid-monohydrate. The beverage was flavored, adjusted to the finished volume of 2 liters and pasteurized as in Example 1. After bottling as in the preceding Examples, a storage stable, clear, acidic beverage of good taste was obtained.

EXAMPLE 4

To a bottle (240 milliliters) containing the beverage of Example 3, dry ice was incrementally added until nearly saturated with $CO_2$ and capped. The bottle was shaken to dissolve the dry ice in it. The carbonated beverage was stable and remained clear. It tasted similar to a commercial, carbonated soda.

EXAMPLE 5

A concentrated calcium-containing beverage syrup was prepared and mixed with carbonated water to get a carbonated, calcium-fortified acid beverage. The procedure is described as follows:

0.05 gram sodium benzoate was dissolved in 150 milliliters water. To the solution, 26.9 grams of calcium gluconate was added and dispersed. The solution was heated to about 90° C. to dissolve the gluconate. After cooling to about 30° C., the solution was mixed with 100 grams sucrose and 30 grams maltodextrin (10-20 DE). The solution was stirred (about 100 rpm) until sucrose and maltodextrin were completely dissolved.

2.5 grams of 85 percent phosphoric acid diluted with about 2 milliliters of water was added slowly to the syrup containing gluconate, sucrose and maltodextrin.

2.8 grams of anhydrous citric acid was added slowly to the syrup under stirring. The resultant 250 milliliters of syrup was clear. To the syrup, 0.55 milliliters of Natural Lemon/Lime flavor was added.

The syrup was cooled to about 4° C. and poured slowly into 750 milliliters of cold, carbonated water (commercial seltzer water) in a bottle and capped immediately. The resultant carbonated beverage was mixed well and stored in the refrigerator. The beverage contained 0.25 percent weight/volume calcium, 10 percent sucrose and 3 percent maltodextrin with a pH of about 3.5.

The carbonated, calcium-fortified acid beverage was stable, clear and free of off taste. It was palatable and tasted like a commercial carbonated soda.

EXAMPLE 6

0.05 grams sodium benzoate was dissolved in 80 milliliters water. To the solution, 13.45 grams of calcium gluconate was added and dispersed. The solution was heated to about 90° C. to dissolve the gluconate. The solution was cooled to about room temperature for complete dissolution of calcium carbonate which is added later.

To the clear gluconate solution, 3.13 grams of calcium carbonate was dispersed under stirring. Care was taken to avoid lumping. A dry mix of 30 grams maltodextrin and 100 grams sucrose was added slowly under stirring. 5.63 grams of phosphric acid (85 percent) diluted with 3 milliliters of water was added incrementally to the syrup containing the calcium gluconate, calcium carbonate, sucrose and maltodextrin. Extensive bubbling was observed as the acid was added. Good stirring is essential. After the acid was added, the syrup was stirred until the bubbling stopped. 4.8 grams of anhydrous citric acid was added incrementally to the syrup. After all the acid was added, the syrup was stirred until a clear syrup is obtained. The volume of the syrup was 170 milliliters.

The syrup was cooled to about 4° C. and poured slowly into 830 milliliters of carbonated water alternately flavored with 0.62 milliliters of lemon/lime flavor following the procedure described in Example 5. The beverage contained 0.25 percent weight/volume calcium, 10 percent sucrose and 3 percent maltodextrin.

The carbonated, calcium-fortified acid beverage was stable, clear and free of off taste. It was palatable and tasted like a commercial carbonated soda.

What is claimed is:

1. A method for preparing a substantially clear, storage stable, palatable, flavored acidic beverage which does not develop an after taste containing calcium gluconate as the major source of calcium comprising heating calcium gluconate in water at native pH for a period of time and at a temperature ranging from about 50° C. to about 95° C. and sufficient to dissolve the gluconate, and acidifying the so prepared solution of gluconate with a food grade acid to a pH of about 4 and below, said acid not developing an off taste in combination with the calcium gluconate, the calcium gluconate solution being flavored to provide a flavored acidic beverage.

2. The method as recited in claim 1 wherein said beverage contains at least 300 milligrams calcium per 240 milliliters of beverage and said gluconate is used in an amount sufficient to provide at least about 150 milligrams calcium per 240 milliliters.

3. The method as recited in claim 1 wherein the acid is a food-grade organic acid.

4. The method as recited in claim 3 wherein the said organic acid is citric acid.

5. The method as recited in claim 3 wherein said food-grade organic acid is selected from the group consisting of citric acid, malic acid, fumaric acid, adipic acid, lactic acid, tartaric acid and mixtures thereof.

6. The method as recited in claim 1 wherein said solution is acidified using a food-grade organic acid in combination with food-grade phosphoric acid, said phosphoric acid being used in an amount less than that which would form an off taste.

7. The method as recited in claim 6 wherein said organic acid is used in a ratio to said phosphoric acid ranging from about 5:1 to about 1:5.

8. The method as recited in claim 1 which further includes the addition of maltodextrin to assist in increasing calcium absorption in the body.

9. The method as recited in claim 1 wherein said beverage is carbonated.

10. The method as recited in claim 1 which further includes a minor proportion based on the weight of the calcium of an alternate food grade source of calcium.

11. The method as recited in claim 10 wherein said alternate source of calcium is selected from the group consisting of calcium lactate, calcium citrate, calcium carbonate, calcium oxide, calcium hydroxide, calcium orthophosphate, calcium glubionate, calcium gluceptate, calcium lactophosphate, calcium glycerophosphate, calcium ascorbate, calcium acetate, calcium levulinate, calcium tartarate, calcium malate and mixtures thereof.

12. The method as recited in claim 11 wherein the alternate source of calcium is calcium carbonate.

13. A method for preparing a substantially clear, acidic, storage stable, palatable, flavored beverage containing calcium gluconate and calcium carbonate as the major source of calcium comprising heating the calcium gluconate alone or in the presence of calcium carbonate in water at the native pH of the gluconate for a period of time and at a temperature ranging from about 50° C. to about 95° C. and sufficient to dissolve the gluconate, and acidifying the so prepared solution of gluconate with a food grade acid to a pH of about 4 and below, said pH being adjusted with an acid which does not develop an off flavor when combined with the calcium compound, the calcium provided by calcium gluconate being in a ratio of calcium provided by calcium carbonate ranging from about 4:1 to about 1:4 based on the weight of the calcium, the calcium gluconate solution being flavored to provide a flavored acidic beverage.

14. The method as recited in claim 13 wherein the pH is adjusted with a food-grade organic acid or a food-grade organic acid in combination with a food-grade mineral acid.

* * * * *